United States Patent

Cazier et al.

Patent Number: 6,148,152
Date of Patent: Nov. 14, 2000

[54] COMPENSATION FOR THERMAL DEGRADATION OF THE OPTICAL PERFORMANCE IN A DIGITAL IMAGING SYSTEM

[75] Inventors: Robert Cazier, Fort Collins; Charles H McConica, Ft Collins, both of Colo.

[73] Assignee: Hewlett-Packard Company, Palo Alto, Calif.

[21] Appl. No.: 09/327,992

[22] Filed: Jun. 8, 1999

[51] Int. Cl.⁷ ..................................................... G03B 13/36
[52] U.S. Cl. ............................. 396/97; 348/243; 348/349
[58] Field of Search .............................. 396/97; 348/244, 348/243, 349, 345; 250/201.2

[56] References Cited

U.S. PATENT DOCUMENTS

| | | | |
|---|---|---|---|
| 4,194,220 | 3/1980 | Frame | 358/221 |
| 4,437,743 | 3/1984 | Sakai et al. | 396/97 |
| 4,635,126 | 1/1987 | Kinoshita | 396/97 X |
| 5,815,968 | 11/1998 | Dehli | 40/476 |

Primary Examiner—W. B. Perkey
Attorney, Agent, or Firm—Steven L. Webb

[57] ABSTRACT

A system for thermal compensation of the optical performance of a lens system in a digital imaging device can improve the performance of the digital imaging system. The dark current from the photosensor is used to measure the temperature of the lens system. The digital processing system can use the temperature information to correct for aberrations in the lens system caused by changes in temperature. The focus function can use the temperature information to more accurately position the lens for optimum focus.

3 Claims, 3 Drawing Sheets

COMPENSATION FOR THERMAL DEGRADATION OF THE OPTICAL PERFORMANCE IN A DIGITAL IMAGING SYSTEM

FIELD OF THE INVENTION

The field of this invention is a lens system and more specifically a lens system in a digital-imaging device.

BACKGROUND OF THE INVENTION

Digital cameras typically have two focusing methods available. One method is an auto focus mode and the other method is a manual focus mode where the user sets the distance for the object to be focused. The manual focus mode is used when the auto focus mode is incorrectly determining the correct focus for the object the user wishes to photograph. In the manual mode the user sets a distance and the camera typically moves the lens to a position that corresponds to the focus for that distance. FIG. 1 shows the distances used in the calculation to determine the proper lens location. Distance f is the focal length of the lens, distance s is the distance from the lens to the object to be focused, and distance s' is the distance from the lens to the image of the object. In the manual focus mode the user sets the distance s and the camera calculates distance s' using the formula 1/s'=1/f+1/s. Once distance s' has been determined the camera will position the lens for the correct focus.

The focal length of a lens is dependent on the focal length of each element in the lens and the spacing between the lens elements. The focal length of an individual lens element is dependent on the index of refraction of the material used for that lens element, the curvature of the two surfaces of the lens element and the thickness of the lens element. The index of refraction, the curvature of the surface and the thickness of the lens are dependent on the temperature of the lens element. The spacing of the lens elements is also dependent on the temperature of the lens system. This means that a change in temperature of the lens system will typically change the focal length for the lens system. When the temperature of the lens system in a digital camera changes without a corresponding change in the focal length used in the calculation to determine the correct lens position for a given object distance, the lens will not be positioned correctly for optimum focus.

Scanners are digital imaging systems that have a constant distance between the object and the lens, and between the image and the lens. When there is a change in temperature in a scanner the focal length of the lens changes. Typically scanner lenses are fixed in place and can not be adjusted for the change in focal length. When the change in focal length is known, the image can be digitally adjusted to compensate for the change in focus.

There is a need for a digital imaging system that can adjust for changes in temperature and determine optimum focus for a given object distance.

SUMMARY OF THE INVENTION

A system for thermal compensation of the optical performance of a lens system in a digital imaging device can improve the performance of the digital imaging system. The dark current from the photosensor is used to measure the temperature of the lens system. The digital processing system can use the temperature information to correct for aberrations in the lens system caused by changes in temperature. The focus function can use the temperature information to more accurately position the lens for optimum focus.

DETAILED DESCRIPTION OF THE PREFERRED EMBODIMENT

A system for thermal compensation of the optical performance of a lens system in a digital imaging device can improve the performance of the digital imaging system. Digital imaging systems such as digital cameras and scanners typically have a photosensor to convert the image of the object into electronic form. Typically the photosensors in digital cameras and scanners are charged coupled devices (CCD). Scanners have linear arrays of photosensors and digital cameras have area arrays of photosensors. The output of a CCD is made up of two components. The main component is a signal that is proportional to the intensity of light hitting each CCD element, integrated over a fixed time. There is also a leakage current component. The leakage current component is commonly known as dark current because the CCD produces the leakage current even in the absence of light. The dark current is the charge accumulated on the CCD during a fixed time, typically the same time that is used for the normal exposure. The dark current is dependent on the temperature of the CCD. Typically the dark current will double for every 7–8 degree C change in temperature. Once the dark current for a CCD at a given temperature is known, the present temperature of the CCD can be determined by a measurement of the dark current for that CCD. For example, when a CCD has a dark current of 10 milliamps at 25 degrees C, the temperature of the CCD when the dark current is 20 milliamps could be determined by the formula $$T_c = \frac{8I_c}{2I_B} + T_B.$$

Where $T_c$ is the present temperature, $I_c$ is the present dark current, $I_B$ is the known dark current at the given temperature $T_B$. The temperature of the CCD is 33 degrees C when the dark current is 20 milliamps $(33=((8*20)/(2*10))+25)$. The dark current can be measured in a digital camera by either having pixels on the CCD that are permanently covered by an opaque material or taking a measurement when the shutter is closed. The dark current can be measured in a scanner with pixels on the CCD that are permanently covered or by taking a measurement with the carriage under the top cover of the scanner. To determine the dark current at a known temperature the digital imaging system can be placed in a chamber at a known temperature or an auxiliary thermometer can be temporarily placed onto the system while a dark current measurement is done. This measured dark current at a known temperature is stored for later use.

The focal length of a single lens is given by the equation $$\frac{1}{f} = (N-1)\left[\frac{1}{R_1} - \frac{1}{R_2} + \frac{t(N-1)}{R_1 R_2 N}\right]$$

Figure 1:
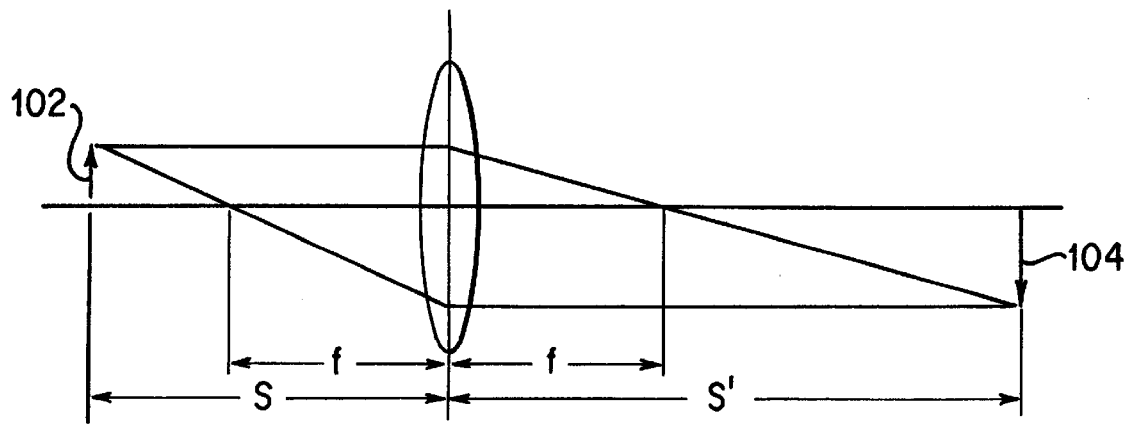
FIG. 1 is a side view block diagram of the distances for the object and image in a lens system.
Figure 2:
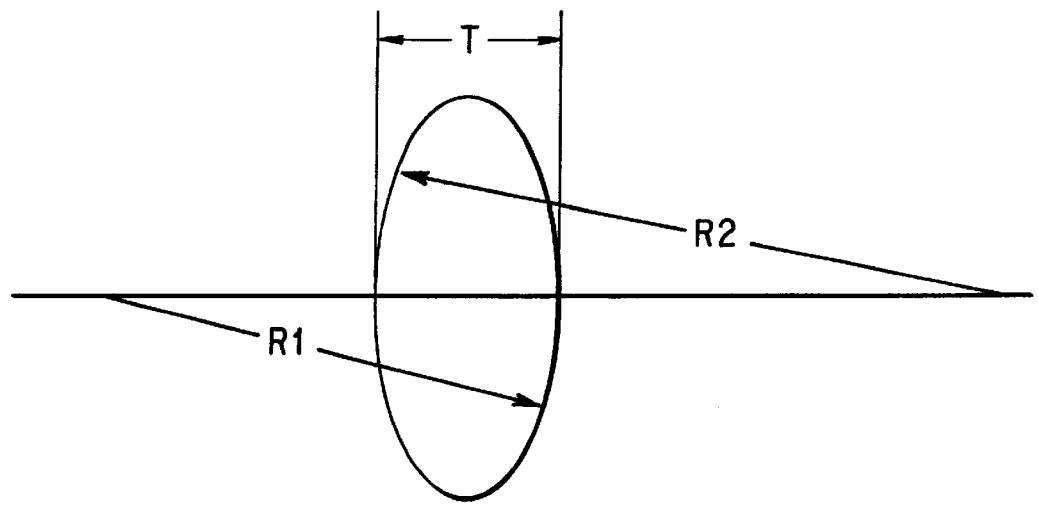
FIG. 2 is a side view block diagram of a lens.

(see FIG. 2). Where f is the focal length, $R_1$ is the radius of curvature of the first surface of the lens, $R_2$ is the radius of curvature of the second lens surface, t is the lens thickness, and N is the index of refraction of the lens material. Each of these components is dependent on temperature. The index of refraction for the material used is typically listed by wavelength with a correction factor $\Delta N/\Delta t$ for the change in refractive index with temperature that can be applied within a given temperature range. For example, BK7 is a common Schott Glass that has a temperature coefficient of refractive index of $2.8 \times 10^{-6}$ in the range between +20 and +40 degrees C. The lens thickness and radius of curvatures of the lens change with temperature depending of the coefficient of thermal expansion. The length at a new temperature is given by the formula NL=OL+OL*A*DT where NL is the new length, OL is the old length, A is the thermal coefficient of expansion for the lens material, and DT is the change in temperature. The thermal coefficient of expansion for lens materials is typically listed as a correction factor usable up to a limiting temperature. For example the thermal coefficient of expansion for BK7 is $7.1 \times 10^{-6}$ for temperatures up to 70 degrees C.

The focal length of a lens system made up of two component lenses is given by the equation $$Fab = \frac{FaFb}{Fa + Fb - d}.$$

Where Fab is the focal length of the system, Fa is the focal length of single lens a, Fb is the focal length of single lens b, and d is the distance between the two lens elements. With a change in temperature, the focal lengths of each lens element can be recalculated and the distance between the elements can be determined by using the coefficient of thermal expansion of the material used to mount the two lens elements. Using these formulas the focal length of a lens system can be calculated for a range of temperatures.

Figure 4:
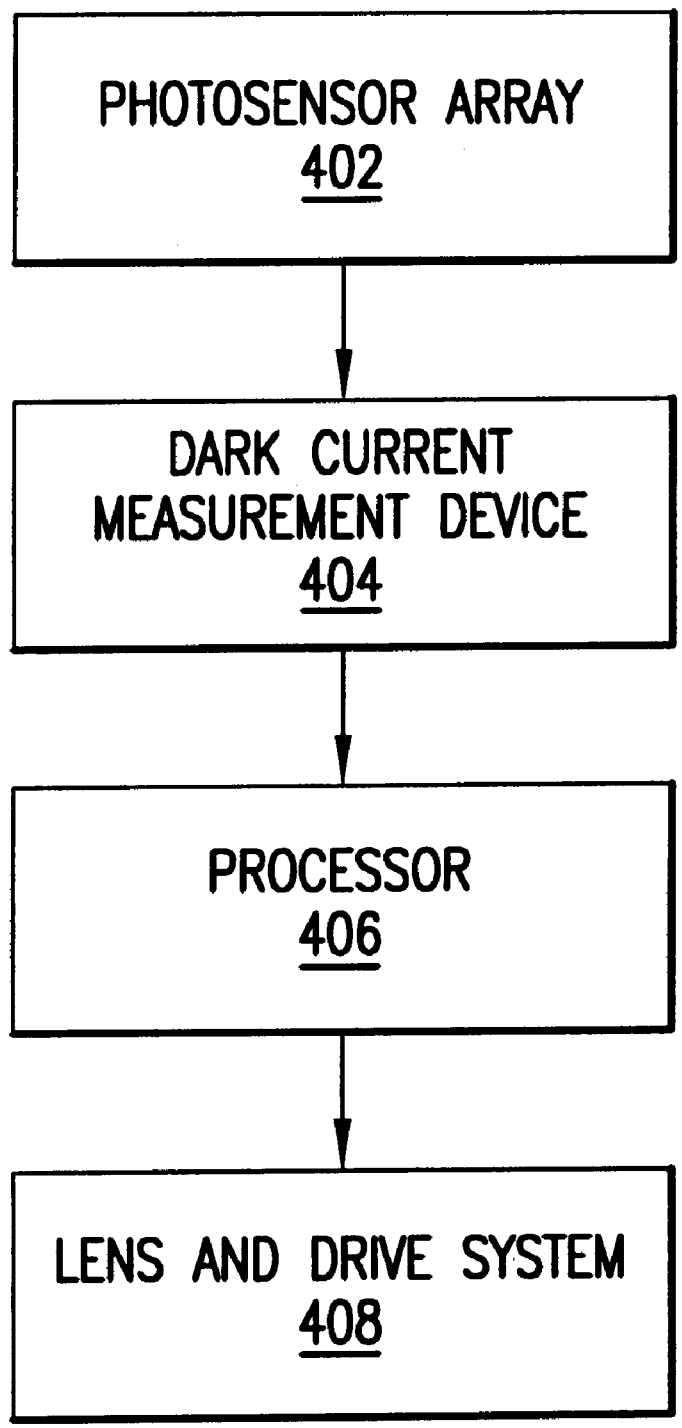
FIG. 4 shows a block diagram of a system for temperature compensation in accordance with the present invention.

FIG. 4 shows a block diagram of a system for temperature compensation in a digital camera. The dark current from the photosensor array 402 is measured 404 and the processor 406 calculates and then positions the lens 408 for optimum focus.

In the preferred embodiment of the invention the calculations for converting the dark current measurement into temperature are done external from the digital imaging system. For a digital camera the calculations for a range of dark current measurements are tabulated with the corresponding temperature equivalent. This calculation makes use of the measured dark current at a known temperature. The focal length for the lens is also calculated over a range of temperature values. And the correct lens position for optimum focus is calculated for a range of focal lengths. The focal length vs. temperature information, the dark current vs. temperature information, and the lens position vs. focal length information are combined to give a direct correlation between dark current vs. optimum focus position. This information, in tabular form, is installed into the digital camera and stored in nonvolatile memory and allows a simple lookup for the correct lens position given a measured dark current. By using the tabular form of this information the processor in the digital camera is freed from performing the computationally intensive calculations.

Figure 3:
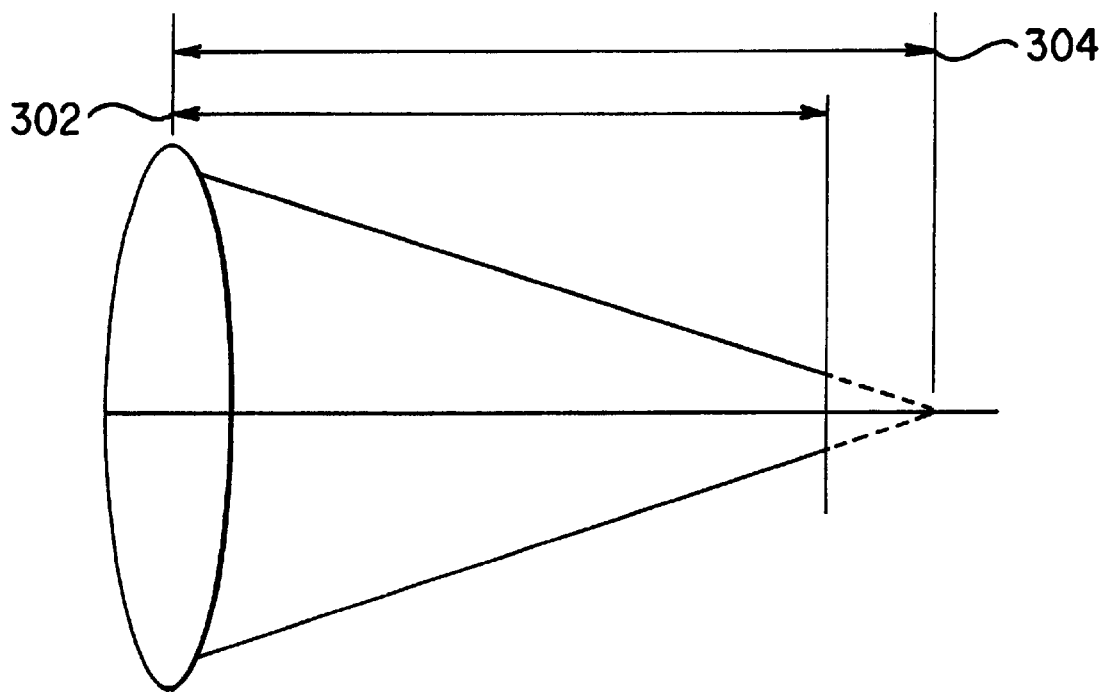
FIG. 3 is a side view block diagram showing defocus in a lens.

In a scanner the lens is typically fixed in place. A change in temperature causing a change in focal length in the lens system can not be compensated for by adjusting the lens position. It is well know in the art that a known amount of defocus in a digital image can be corrected with digital image processing. Defocus is the difference between the actual distance between the image and the lens 302 and the distance between the image and the lens 304 at optimum focus (see FIG. 3).

By measuring the dark current of the CCD the current temperature of the lens system with its corresponding focal length can be determined. Knowing the current focal length the amount of defocus for the system can be calculated. In the preferred embodiment, the computationally intensive calculation to determine the amount of defocus, given a measured dark current, is done external from the scanner. The dark current vs. defocus amount is in the scanner in a tabular form such that the processor looks up the defocus amount given a measured dark current. Once the defocus amount has been determined the defocus amount is used as an input to the digital focus compensation. For examples of digital image refocusing with a known defocus amount see *The image processing handbook* $2^{nd}$ ed., John C. Russ, CRC Press, Inc. 1995 (ISBN 0-8493-2516-1).

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A digital imaging system comprising:

a lens that creates an image from an object;

a photosensor array configured to receive the image of the object;

a sensor to measure the dark current from the photosensor array;

a processor that receives the dark current measurement and compensates for temperature effects, based on the dark current measurement;

a drive mechanism for moving the lens to focus the image of the object on the photosensor;

the processor compensates by adjusting the lens position.

2. A method for thermal compensation of a digital imaging system comprising the steps of:

measuring the dark current of a photo array;

compensating the imaging system based on the measured dark current where the compensation of the imaging system is done by adjusting the position of a lens to obtain optimum focus.

3. A method for thermal compensation of a digital imaging system comprising the steps of:

measuring the dark current of a photo array;

compensating the imaging system based on the measured dark current;

converting the dark current measurement into temperature information;

determining the optical properties of a lens for the current temperature.

* * * * *